US010824161B2

United States Patent
Aiba et al.

(10) Patent No.: US 10,824,161 B2
(45) Date of Patent: Nov. 3, 2020

(54) AUTOMATIC STEERING CONTROL APPARATUS

(71) Applicant: SUBARU CORPORATION, Tokyo (JP)

(72) Inventors: Tomoari Aiba, Tokyo (JP); Masayuki Murakoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 254 days.

(21) Appl. No.: 15/951,035

(22) Filed: Apr. 11, 2018

(65) Prior Publication Data
US 2018/0364733 A1 Dec. 20, 2018

(30) Foreign Application Priority Data
Jun. 15, 2017 (JP) .................. 2017-117963

(51) Int. Cl.
| | |
|---|---|
| G05D 1/02 | (2020.01) |
| B62D 15/02 | (2006.01) |
| G05D 1/00 | (2006.01) |
| G06K 9/00 | (2006.01) |

(52) U.S. Cl.
CPC ......... *G05D 1/0251* (2013.01); *B62D 15/025* (2013.01); *B62D 15/029* (2013.01); *G05D 1/0061* (2013.01); *G05D 1/0214* (2013.01); *G05D 1/0274* (2013.01); *G05D 1/0278* (2013.01); *G06K 9/00798* (2013.01)

(58) Field of Classification Search
CPC .............................. B62D 15/025; B62D 15/029
See application file for complete search history.

(56) References Cited

U.S. PATENT DOCUMENTS

| | | | |
|---|---|---|---|
| 2015/0178998 A1* | 6/2015 | Attard | .................... G07C 5/008 701/23 |
| 2018/0170374 A1* | 6/2018 | Otsuka | .................. B60W 50/02 |

FOREIGN PATENT DOCUMENTS

JP 2002-175597 A 6/2002

\* cited by examiner

*Primary Examiner* — Imran K Mustafa
(74) *Attorney, Agent, or Firm* — McGinn I.P. Law Group, PLLC

(57) ABSTRACT

An automatic steering control apparatus includes a steering controller and a steering instruction unit. The steering controller includes a storage, an instruction value checking unit, and a steering control unit, and controls operation of a steering device of a vehicle. The steering instruction unit includes an instruction value calculator and an estimated instruction value calculator, and outputs an instruction value to the steering controller. The instruction value calculator calculates a latest course and calculates the instruction value. The estimated instruction value calculator calculates a future course and calculates an estimated instruction value. The storage stores the estimated instruction value acquired from the estimated instruction value calculator during a past predetermined period. The instruction value checking unit determines whether an abnormality is present in the steering instruction unit by comparing the instruction value for a current point and the estimated instruction value corresponding to the current point.

9 Claims, 3 Drawing Sheets

| RECEPTION TIME | |
|---|---|
| $t = -1 \cdot \Delta T$ | DATA(500) |
| $t = -2 \cdot \Delta T$ | DATA(499) |
| $t = -3 \cdot \Delta T$ | DATA(498) |
| ⋮ | ⋮ |
| $t = -498 \cdot \Delta T$ | DATA(3) |
| $t = -499 \cdot \Delta T$ | DATA(2) |
| $t = -500 \cdot \Delta T = -X$ | DATA(1) |

FIG. 2

AUTOMATIC STEERING CONTROL APPARATUS

CROSS-REFERENCE TO RELATED APPLICATIONS

The present application claims priority from Japanese Patent Application No. 2017-117963 filed on Jun. 15, 2017, the entire contents of which are hereby incorporated by reference.

BACKGROUND

The technology relates to an automatic steering control apparatus for vehicle.

A known automatic steering control apparatus, for example, as disclosed in Japanese Unexamined Patent Application Publication No. 2002-175597, may have an outside surrounding condition recognizer and may automatically steer a vehicle on the basis of a result of recognition performed by the outside surrounding condition recognizer. The outside surrounding condition recognizer recognizes the conditions surrounding the vehicle, such as the shape of a way in front of the vehicle.

SUMMARY

An aspect of the technology provides an automatic steering control apparatus that includes a steering controller and a steering instruction unit. The steering controller is configured to control operation of a steering device of a vehicle. The steering instruction unit is configured to output an instruction value to the steering controller. The steering instruction unit includes an instruction value calculator and an estimated instruction value calculator. The instruction value calculator is configured to calculate a latest course and calculates the instruction value, on the basis of latest information of one or both of outside surrounding condition information of the vehicle and map information regarding a way on which the vehicle travels. The latest course is a course in accordance with a shape, of the way, at a point immediately in front of the vehicle. The instruction value is a value that allows the vehicle to travel along the latest course. The estimated instruction value calculator is configured to calculate a future course and calculates an estimated instruction value, on the basis of one or both of the outside surrounding condition information of the vehicle and the map information. The future course is a course in accordance with a shape, of the way, at a point at which the vehicle is to travel in future. The estimated instruction value is an estimated value that is to be output to the steering device on a condition that the vehicle is to be caused to travel along the future course. The steering controller includes a storage, an instruction value checking unit, and a steering control unit. The storage is configured to store the estimated instruction value acquired from the estimated instruction value calculator during a past predetermined period. The instruction value checking unit is configured to determine whether an abnormality is present or absent in the steering instruction unit by comparing the instruction value for a current point, on the way, at which the vehicle travels and the estimated instruction value, stored in the storage, corresponding to the current point, on the way, at which the vehicle travels. The steering control unit is configured to control the operation of the steering device on the basis of the instruction value.

An aspect of the technology provides an automatic steering control apparatus that includes a storage and circuitry. The storage is configured to store an estimated instruction value acquired during a past predetermined period. The circuitry is configured to control operation of a steering device of a vehicle. The circuitry is configured to output an instruction value. The circuitry is configured to calculate a latest course and calculates the instruction value, on the basis of latest information of one or both of outside surrounding condition information of the vehicle and map information regarding a way on which the vehicle travels. The latest course is a course in accordance with a shape, of the way, at a point immediately in front of the vehicle. The instruction value is a value that allows the vehicle to travel along the latest course. The circuitry is configured to calculate a future course and calculates an estimated instruction value, on the basis of one or both of the outside surrounding condition information of the vehicle and the map information. The future course is a course in accordance with a shape, of the way, at a point at which the vehicle is to travel in future. The estimated instruction value is an estimated value that is to be output to the steering device on a condition that the vehicle is to be caused to travel along the future course. The circuitry is configured to determine whether an abnormality is present or absent by comparing the instruction value for a current point, on the way, at which the vehicle travels and the estimated instruction value, stored in the storage, corresponding to the current point, on the way, at which the vehicle travels. The circuitry is configured to control the operation of the steering device on the basis of the instruction value.

BRIEF DESCRIPTION OF THE DRAWINGS

FIG. 2 is a diagram describing a state of storing estimated instruction values.

DETAILED DESCRIPTION

Figure 1:
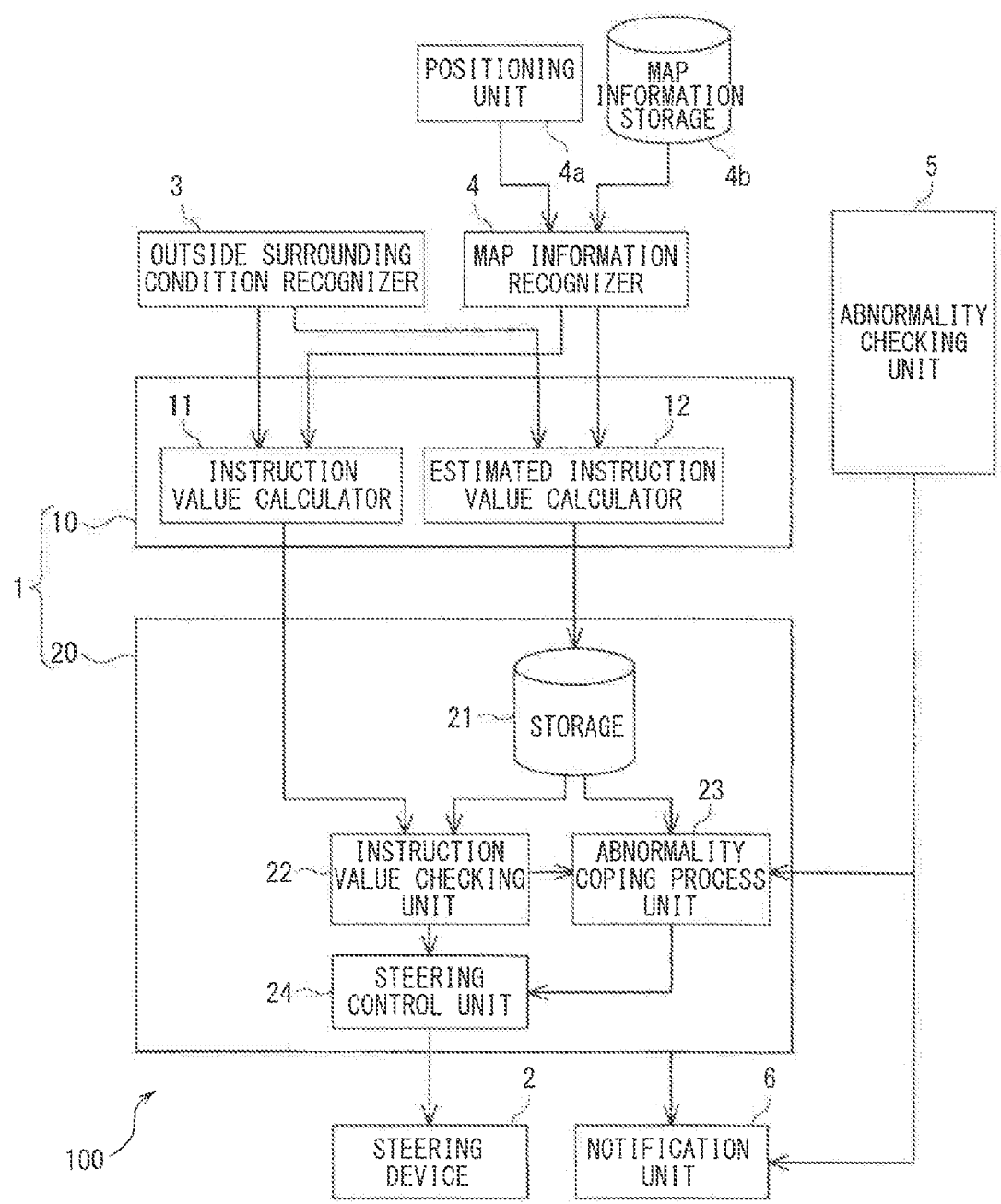
FIG. 1 is a diagram illustrating an example of a configuration of an automatic steering system.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

An automatic steering control apparatus is usually required to detect an abnormality in an automatic steering process and allow early shifting to manual steering. It is desirable to provide an automatic steering control apparatus that detects an abnormality in an automatic steering operation to enable early shifting to manual steering.

FIG. 1 illustrates an automatic steering control apparatus 1 that may be mounted on a vehicle provided with an automatic steering system 100. The automatic steering control apparatus 1 may control operation of a steering device 2 mounted on the vehicle. The automatic steering system 100 may include the automatic steering control apparatus 1, an outside surrounding condition recognizer 3, and a map information recognizer 4. The automatic steering system 100 may further include an abnormality checking unit 5 and a notification unit 6.

The automatic steering control apparatus 1 may control the steering device 2 to implement a vehicle automatic driving function and a vehicle driving assist function performed by the automatic steering system 100. The steering device 2 may be an electric power steering that includes an electric actuator and that varies a steering angle of a vehicle by an output of the electric actuator.

The outside surrounding condition recognizer 3 may recognize, for example, the shape of a traveling way in front of the vehicle and an object present in the traveling way and in the surroundings of the traveling way, on the basis of information from a sensor that recognizes the outside surrounding conditions of the vehicle. The outside surrounding condition recognizer 3 may include, for example, a stereo camera of which the visual field covers the front sight of the vehicle, as the sensor that recognizes the outside surrounding conditions. The outside surrounding condition recognizer 3 may recognize the surrounding condition in front of the vehicle by referring to a photographed image that is taken by the stereo camera and that is subjected to a known image process or other process.

For example, the outside surrounding condition recognizer 3 may recognize a lane mark on a way surface along the traveling way of the vehicle. The lane mark is a way mark having a shape such as a line shape or a broken line shape provided on a way surface along a boundary on each side of a vehicle traffic lane to indicate the vehicle traffic lane. A recognizer for recognizing the surrounding conditions in front of a vehicle by using a stereo camera is publicly known, and therefore, the details of a configuration thereof is not described.

The map information recognizer 4 may include a positioning unit 4a and a map information storage 4b. The positioning unit 4a may determine a current location of the vehicle on the basis of one or a combination of a satellite positioning system, an inertial navigation system, and a road-to-vehicle communication system. The current location of the vehicle may be obtained in terms of latitude and longitude. The map information storage 4b may store map information. The map information may include information representing the shape of a way, such as a curvature of the way, a longitudinal slope, and the condition of the way crossing another way. The map information recognizer 4 may recognize the shape of the traveling way in front of the vehicle on the basis of the current location of the vehicle determined by the positioning unit 4a and the map information stored in the map information storage 4b.

The abnormality checking unit 5 may determine whether each unit constituting the automatic steering system 100 operates normally and thereby detect occurrence of an abnormality. For example, the outside surrounding condition recognizer 3 or the map information recognizer 4 may be unable to recognize the shape of a way, or a communication path between the automatic steering control apparatus 1 and the outside surrounding condition recognizer 3 or the map information recognizer 4 may be disconnected. In such cases, it may be difficult for the automatic steering control apparatus 1 to normally control the steering device 2. In view of these cases, upon detecting occurrence of an abnormality, the abnormality checking unit 5 may notify the automatic steering control apparatus 1 of the occurrence of the abnormality to make the automatic steering control apparatus 1 perform an abnormality coping process.

The notification unit 6 may give an alarm in a case where an abnormality occurs in any of various components of the vehicle and may give an alarm for calling attention of a driver. The notification unit 6 may also notify the driver of various pieces of information on the automatic steering system 100. The notification unit 6 may include, for example, a display for displaying contents such as an image or a character, a light emitting unit for light emission, a speaker for generating a sound, a vibrator for generating a vibration, or a combination thereof, to supply information from the automatic steering system 100 to the driver.

The automatic steering system 100 may control, on the basis of the information on the shape of the traveling way of the vehicle, which is recognized by the outside surrounding condition recognizer 3 and the map information recognizer 4, the operation of the steering device 2 by the automatic steering control apparatus 1 so that the vehicle will travel along the shape of the traveling way. The automatic steering control apparatus 1 may include a steering instruction unit 10 and a steering controller 20.

In outline, the steering instruction unit 10 may calculate an instruction value on the basis of the following information and output the calculated instruction value. The information may be the information on the shape of the traveling way of the vehicle, which is recognized by one or both of the outside surrounding condition recognizer 3 and the map information recognizer 4, and information on behavior of the vehicle, such as a vehicle current speed and a vehicle yaw rate. The instruction value may be information to be set as a steering target value that should be achieved by the steering device 2, to make the vehicle travel along the shape of the traveling way. The instruction value may be, for example, a value of steering torque that should be generated by the steering device 2, or a value of target steering angle to which the steering device 2 should vary the steering angle.

In outline, the steering controller 20 may control the operation of the steering device 2 on the basis of the instruction value calculated by the steering instruction unit 10. For example, in a case where the instruction value is a value of steering torque, the steering controller 20 may make the steering device 2 generate steering torque corresponding to the instruction value. In another example, in a case where the instruction value is a value of a target steering angle, the steering controller 20 may make the steering device 2 operate so that the steering angle will be the target steering angle.

Next, details of the steering instruction unit 10 will be described. The steering instruction unit 10 may be implemented by a computer that is connected to a central processing unit (CPU), a ROM, a RAM, an input-output unit, or any other component via a bus. The steering instruction unit 10 may include an instruction value calculator 11 and an estimated instruction value calculator 12. These components of the steering instruction unit 10 may be implemented by separate pieces of hardware that execute respective functions. Alternatively, these components may be implemented by software so that the respective functions will be performed by a specific program executed by the CPU.

The instruction value calculator 11 may calculate a latest course that should be taken by the vehicle at the current time and calculate the instruction value to be provided to the steering device 2 to make the vehicle travel along the calculated latest course, on the basis of the latest information on the shape of the traveling way of the vehicle, which is recognized by one or both of the outside surrounding condition recognizer 3 and the map information recognizer 4.

That is, the instruction value calculator 11 may recognize the latest information on the shape of the way in front of the vehicle by using a unit such as the outside surrounding condition recognizer 3 including the stereo camera, or the map information recognizer 4. Further, the instruction value calculator 11 may calculate the instruction value that is to be the target value of the steering to be immediately performed by the steering device 2 to make the vehicle travel along a way shape of the latest recognition result.

The instruction value calculator 11 may calculate the instruction value at a predetermined period $\Delta T$ and output the calculated instruction value to the steering controller 20. Although the value of the predetermined period $\Delta T$ is not particularly limited, in an example of the implementation of the technology, the period $\Delta T$ may be about 10 milliseconds, at which the steering instruction unit 10 calculates and outputs the instruction value. The value of the predetermined period $\Delta T$ may be variable.

The estimated instruction value calculator 12 may calculate a future course on which the vehicle is expected to travel in the future and calculate an estimated instruction value to be provided to the steering device 2 on a condition that the vehicle is to be caused to travel along the calculated future course, on the basis of the information on the shape of the traveling way of the vehicle, which is recognized by one or both of the outside surrounding condition recognizer 3 and the map information recognizer 4. As used herein, the term "in the future" may refer to a point in time when a predetermined time period X passes from the current time or at a point in time when the vehicle travels a predetermined distance D1 from the current location. The predetermined time period X and the predetermined distance D1 may be variable.

For example, the estimated instruction value calculator 12 may recognize the shape of the way in the advance direction of the vehicle by using a unit such as the outside surrounding condition recognizer 3 including the stereo camera, or the map information recognizer 4. Further, the estimated instruction value calculator 12 may calculate the future course. The future course may be a course to be taken in a case where the vehicle is to travel along the way shape recognized until a predetermined time period Y passes from the current time. The estimated instruction value calculator 12 may further calculate the estimated instruction value that is to be a target value of the steering that should be performed by the steering device 2 to make the vehicle travel along the future course, at a point in time when the predetermined time period X passes from the current time. In this case, the predetermined time period X is shorter than the time period Y.

In another example, the estimated instruction value calculator 12 may recognize the shape of the way in the advance direction of the vehicle by using a unit such as the outside surrounding condition recognizer 3 including the stereo camera, or the map information recognizer 4. Further, the estimated instruction value calculator 12 may calculate the future course on which the vehicle will travel along the recognized way shape until the vehicle travels a predetermined distance D2 from the current location. The estimated instruction value calculator 12 may further calculate the estimated instruction value that is to be the target value of the steering that should be performed by the steering device 2 to make the vehicle travel along the future course, at a point in time when the vehicle travels a predetermined distance D1 from the current location. In this case, the predetermined distance D1 is shorter than the distance D2.

The estimated instruction value calculator 12 may calculate the estimated instruction value at the predetermined period $\Delta T$ and output the calculated estimated instruction value to the steering controller 20 synchronously with the calculation of the instruction value of the instruction value calculator 11. In an example of the implementation of the technology, the estimated instruction value calculator 12 may calculate an estimated instruction value at a point in time when a predetermined time of X seconds passes. For example, in the implementation of the technology, "X seconds" may be five seconds.

Next, details of the steering controller 20 will be described. The steering controller 20 may be implemented by a computer that is connected to a CPU, a ROM, a RAM, an input-output unit, or any other component via a bus and may control the steering device 2. The steering controller 20 may include a storage 21, an instruction value checking unit 22, an abnormality coping process unit 23, and a steering control unit 24.

The storage 21 may store the estimated instruction value received from the estimated instruction value calculator 12 during a past predetermined period. In an example of the implementation of the technology, the estimated instruction value that is received from the estimated instruction value calculator 12 during a predetermined period from the current time to a time in the past by a predetermined X seconds may be stored.

As described above, in the implementation of the technology, the estimated instruction value calculator 12 may output an estimated instruction value corresponding to the steering of the vehicle at the time when the predetermined X seconds passes from the current time, at every period of $\Delta T$ seconds. Thus, as illustrated in FIG. 2, the storage 21 may store the "X/$\Delta T$" number of estimated instruction values that are received during the past X seconds.

The storage 21 may delete the stored estimated instruction value that is received at the earliest time, upon receiving a new estimated instruction value. As described above, in the implementation of the technology, the predetermined time X may be about 5 seconds, and the predetermined period $\Delta T$ may be about 10 milliseconds. Therefore, the storage 21 may store 500 estimated instruction values that are received during the past 5 seconds.

Referring to FIG. 2, the symbol "t" (seconds) may be a reception time of each estimated instruction value. The current time is represented by t=0. In the description below, multiple estimated instruction values stored in the storage 21 may be represented by reference symbols on the assumption that the oldest estimated instruction value received at t=−(X/$\Delta T$)=−5 is represented by DATA (1) and that the estimated instruction value that is the oldest next to DATA (1) is represented by DATA (2). That is, the latest estimated instruction value may be represented by DATA (500), and an estimated instruction value that is received about 10 milliseconds before DATA (500) is received may be represented by DATA (499).

FIG. 2 illustrates an example of a storage region of the storage 21 that is likened to multiple shelves aligned in the upper and lower direction. The bottom shelf may store DATA (1), which is the oldest estimated instruction value, and an upper shelf may store a newer estimated instruction value. In this case, upon receiving a new instruction value, the storage 21 may delete the content of DATA (1) in the bottom shelf and store the already-stored contents of all of the rest of the shelves by lowering the already-stored contents to the respective next lower shelves. The newly-received estimated instruction value may be stored as DATA (500) in the top shelf.

FIG. 2 is described for explanation purpose, and the form for storing the multiple estimated instruction values by the storage 21 is not limited to the example illustrated in FIG. 2. It may be sufficient that the storage 21 stores the respective reception times of all of the stored estimated instruction values received during a past predetermined period in a state in which the respective reception times are recognizable by the instruction value checking unit 22. The instruction value checking unit 22 will be described later.

In the example illustrated in FIG. 2, the instruction value checking unit 22 may recognize timing when the estimated instruction value is received, from the shelf containing the estimated instruction value. However, for example, since the storage 21 stores the estimated instruction values in conjunction with the reception times, the instruction value checking unit 22 may recognize the reception timing of each of the estimated instruction values from the stored reception time.

The instruction value checking unit 22 may compare the current instruction value that is received from the instruction value calculator 11 and an estimated instruction value received X seconds ago and stored in the storage 21, to determine whether the operation of the steering instruction unit 10 is normal. In a case where the steering instruction unit 10 is normal, that is, an abnormality is absent in the steering instruction unit 10, the instruction value checking unit 22 may make the instruction value calculator 11 output the calculated instruction value to the steering control unit 24. Otherwise, in a case where the steering instruction unit 10 is abnormal, that is, an abnormality is present in the steering instruction unit 10, the instruction value checking unit 22 may stop the instruction value calculator 11 from outputting the instruction value. Further the instruction value checking unit 22 may notify the abnormality coping process unit 23 of the occurrence of the abnormality to cause shifting to the abnormality coping process.

As described above, DATA (1), which is the oldest estimated instruction value stored in the storage 21, may be an instruction value calculated X seconds before the current instruction value is calculated by the instruction value calculator 11, and DATA (1) may be a target value of the steering that should be performed by the steering device 2 to make the vehicle travel along the future course X seconds later, e.g., about 5 seconds later.

That is, DATA (1), which is the oldest estimated instruction value stored in the storage 21, may be a steering target value for making the vehicle travel in accordance with the shape of the way on which the vehicle currently travels, in a case where the steering instruction unit 10 operates normally. Similarly, DATA (2), which is calculated $\Delta T$ seconds after DATA (1) is calculated in the past, may be a steering target value for making the vehicle travel in accordance with the shape of the way on which the vehicle travels $\Delta T$ seconds after the current time, in a case where the steering instruction unit 10 operates normally.

In this configuration, the instruction value checking unit 22 may sequentially read the estimated instruction values stored in the storage 21 from the oldest to the newest, that is, from DATA (1) to DATA (500), at the predetermined period $\Delta T$. Further, the instruction value checking unit 22 may compare the read estimated instruction value and the latest instruction value at the time at which the instruction value checking unit 22 reads the relevant estimated instruction value. The instruction value checking unit 22 may determine the steering instruction unit 10 as being normal if the read estimated instruction and the latest instruction value coincide with each other. Otherwise, the instruction value checking unit 22 may determine the steering instruction unit 10 as being abnormal if the read estimated instruction and the latest instruction value do not coincide with each other and differ from each other. The instruction value and the estimated instruction value may be determined as coinciding with each other on the condition that the difference therebetween is within a predetermined threshold range.

The threshold may be set in consideration of recognition accuracy of the outside surrounding conditions, positioning accuracy of the own vehicle location, the way shape such as a curvature of the way and the lane width, and vehicle behavior such as the vehicle speed and the yaw rate. The threshold may specify an acceptable range within which the difference between the latest instruction value and the corresponding estimated instruction value causes no malfunction in the automatic steering control. In view of a temporal separation between the instruction value and the estimated instruction value due to noise or any other factor, the steering instruction unit 10 may be determined as being abnormal if the instruction value and the estimated instruction value do not coincide with each other continuously by the predetermined number of times or for a predetermined time period.

Upon determining the steering instruction unit 10 as being normal, the instruction value checking unit 22 may allow the instruction value calculator 11 to output the calculated current instruction value to the steering control unit 24. In a normal condition without abnormality notification made by the abnormality coping process unit 23, the steering control unit 24 may control the operation of the steering device 2 on the basis of the instruction value output from the instruction value checking unit 22.

In contrast, in a case where the steering instruction unit 10 is determined as being abnormal, the instruction value checking unit 22 may stop the instruction value calculator 11 from outputting the calculated current instruction value, and may notify the abnormality coping process unit 23 of the occurrence of the abnormality. The abnormality coping process unit 23 may instruct the steering control unit 24 to execute fail-safe control until the driver starts steering manually by recognizing the occurrence of the abnormality. For example, the abnormality coping process unit 23 may read, from the storage 21, an estimated instruction value calculated $\Delta T$ seconds before the current instruction value is calculated, and instruct the steering control unit 24 to perform the fail-safe control on the basis of the read estimated instruction value calculated $\Delta T$ seconds before the current instruction value is calculated.

Figure 3:
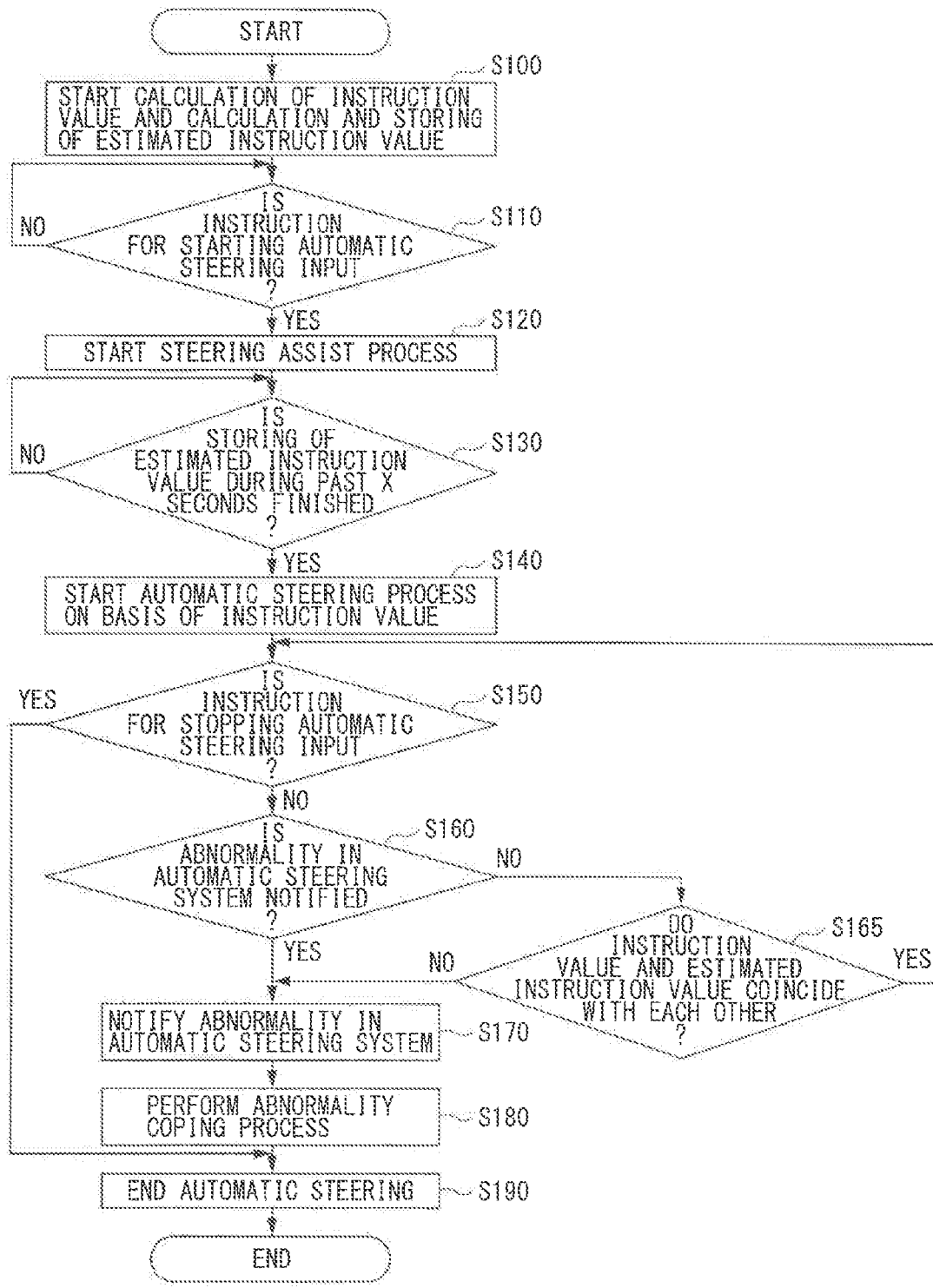
FIG. 3 is a flowchart illustrating operation of an automatic steering control apparatus.

Next, operation of the automatic steering control apparatus 1 having the above configuration will be described with reference to the flowchart illustrated in FIG. 3. The automatic steering control apparatus 1 may execute the processes illustrated in FIG. 3 while the vehicle travels.

The automatic steering control apparatus 1 may first start a calculation process of the instruction value by the instruction value calculator 11 and a calculation process of the estimated instruction value by the estimated instruction value calculator 12 in step S100. Further, in step S100, storing of the estimated instruction value output from the estimated instruction value calculator 12 to the storage 21 may be also started.

Thereafter, as illustrated in step S110, the automatic steering control apparatus 1 may wait for an instruction for starting the automatic steering to be input by the driver of the vehicle. Step S110 may be performed prior to step S100. That is, the calculations of the instruction value and the estimated instruction value and the storing of the estimated instruction value may be started after the instruction for starting the automatic steering is input by the driver.

The automatic steering control apparatus 1 may start the processes of step S120 and the subsequent steps upon determining that the instruction for starting the automatic steering is input by the driver.

In step S120, the automatic steering control apparatus 1 may start a steering assist process. The steering assist process may perform so-called "lane keep assist". The steering assist process may control the steering device 2 on the basis of the information on the shape of the traveling way of the vehicle, which is recognized by the outside surrounding condition recognizer 3 and the map information recognizer 4, to assist control of the driver so as to prevent the vehicle from deviating from the traveling way. Thus, at the time of executing the process in step S120, the automatic steering may be still not started, and it may be difficult to perform so-called "hands-free driving".

In step S130, the automatic steering control apparatus 1 may determine whether estimated instruction values received from the estimated instruction value calculator 12 during the past predetermined X seconds are stored in the storage 21. In one implementation of the technology, whether 500 estimated instruction values from the oldest to the newest, that is, from DATA (1) to DATA (500), are stored in the storage 21 may be determined.

Upon determining that the estimated instruction values received from the estimated instruction value calculator 12 during the past predetermined X seconds are stored in the storage 21 in step S130, the automatic steering control apparatus 1 may move to step S140. In other words, the automatic steering control apparatus 1 may perform the steering assist instead of starting the automatic steering until the estimated instruction values received from the estimated instruction value calculator 12 during the past predetermined X seconds are stored in the storage 21.

In step S140, the automatic steering control apparatus 1 may start the automatic steering process to control the steering device 2 on the basis of the instruction value calculated by the instruction value calculator 11. At the time of executing the process in step S140, the instruction value checking unit 22 may output the instruction value to the steering control unit 24. The executed process in step S140 allows the so-called "hands free driving".

While the automatic steering process is executed, as described in steps S150 and S160, the automatic steering control apparatus 1 may repeat determining whether an instruction for stopping the automatic steering is input by the driver and may also repeat checking whether the abnormality notification is made by the abnormality checking unit 5. Moreover, as described in step S165, the automatic steering control apparatus 1 may repeat checking whether the instruction value calculated by the instruction value calculator 11 coincides with the corresponding estimated instruction value.

Upon detecting the instruction for stopping the automatic steering as being input by the driver in step S150, the automatic steering control apparatus 1 may move to step S190 and end the automatic steering process. In step S160, the automatic steering control apparatus 1 may move to step S170 if occurrence of an abnormality in the automatic steering system 100 is notified by the abnormality checking unit 5, and, otherwise, the automatic steering control apparatus 1 may move to step S165 if occurrence of an abnormality is not notified by the abnormality checking unit 5.

In step S165, the automatic steering control apparatus 1 may read, from the storage 21, an estimated instruction value from X seconds ago, and compare the read estimated instruction value from X seconds ago and the current instruction value calculated by the instruction value calculator 11 with each other. Thereafter, if the estimated instruction value from X seconds ago and the current instruction value coincide with each other, i.e., have a difference within the threshold range, the automatic steering control apparatus 1 may determine the steering instruction unit 10 as being normal and return to step S150 to repeat similar processes.

Otherwise, in step S165, if the estimated instruction value from X seconds ago and the current instruction value do not coincide with each other, i.e., have a difference out of the threshold range, the automatic steering control apparatus 1 may determine the steering instruction unit 10 as having an abnormality and move to step S170. At this time, the automatic steering control apparatus 1 may stop output of the instruction value from the steering instruction unit 10, and may notify the abnormality coping process unit 23 of the occurrence of the abnormality in the steering instruction unit 10.

In step S170, the automatic steering control apparatus 1 may notify the driver of the occurrence of the abnormality in the steering instruction unit 10 or in the automatic steering system 100 by means of the notification unit 6. Further, in step S170, the automatic steering control apparatus 1 may also notify the driver of performing an abnormality coping process, by means of the notification unit 6. The abnormality coping process may be performed in step S180 and is described below.

In step S180, the automatic steering control apparatus 1 may perform the abnormality coping process by the abnormality coping process unit 23. The abnormality coping process may be executed to perform fail-safe control in accordance with a part at which the abnormality occurs. For example, the automatic steering control apparatus 1 may output an instruction value of the steering that enables securing of safety, to the steering control unit 24 on the basis of the past estimated instruction value stored in the storage 21. When a predetermined time period passes after the process in step S180 is executed, the automatic steering control apparatus 1 may move to step S190 and end the automatic steering process.

As described above, the automatic steering control apparatus 1 of one implementation of the technology may calculate the instruction value, and also calculate the estimated instruction value and store the estimated instruction value in the storage 21. The instruction value may be output to the steering device 2 to make the vehicle travel along the course in accordance with the shape of the way on which the vehicle travels. The estimated instruction value may be expected to be output to the steering device 2 on a condition that the vehicle is to travel along the future course corresponding to the shape of the way on which the vehicle will travel in the future. Moreover, the automatic steering control apparatus 1 may compare an instruction value for the current point at which the vehicle travels and an estimated instruction value estimated in the past for the current point. As a result, the automatic steering control apparatus 1 may determine the instruction value as being normal and control the steering device 2 if the instruction value for the current point and the estimated instruction value estimated in the past for the current point coincide with each other, and, otherwise, may determine the instruction value as being abnormal and shift to the abnormality coping process if the instruction value for the current point and the estimated instruction value estimated in the past for the current point do not coincide with each other.

Thus, the automatic steering control apparatus 1 of one implementation of the technology enables early shifting to the manual steering of the driver by detecting an abnormality and stopping the automatic steering control even in a case such as: a case where the outside surrounding condition recognizer 3 performs recognition unstably, whereby an abnormal instruction value is calculated; or a case where the steering instruction unit 10 that calculates the instruction value operates abnormally.

For a typical automatic steering control apparatus, the following coping operation may be performed in a case where an outside surrounding condition recognizer is unable to recognize the outside surrounding conditions. This may occur, for example, when the supply of the electric power to the outside surrounding condition recognizer is interrupted or any other abnormality occurs, due to disconnection of a cable or any other reason. As an example of the coping operation, the typical automatic steering control apparatus may end the automatic steering and notify a driver of a vehicle of the ending of the automatic steering by means of an alarm sound or by any other informing manner, to make the driver to shift to manual steering.

However, even though the outside surrounding condition recognizer normally recognizes the outside surrounding conditions, in an exemplary case where an abnormality occurs in a computing unit that calculates an instruction value for controlling the steering on the basis of a result of the recognition of the outside surrounding conditions, the automatic steering process may be possibly executed on the basis of an abnormal instruction value. This may delay recognition of the abnormality in the automatic steering and shifting to the manual steering by the driver of the vehicle. As a result, the behavior of the vehicle may be disturbed during the delay period.

Each of the steering instruction unit 10 and the steering controller 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the steering instruction unit 10 and the steering controller 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the steering instruction unit 10 and the steering controller 20 illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic steering control apparatus comprising:
a steering controller configured to control operation of a steering device of a vehicle;
a steering instruction unit configured to output an instruction value to the steering controller,
a storage configured to store the estimated instruction value received from the steering instruction unit,
the steering instruction unit including
an instruction value calculator configured to calculate a latest course and calculate the instruction value, on a basis of latest information of one or both of outside surrounding condition information of the vehicle and map information regarding a way on which the vehicle travels, the latest course being a course in accordance with a shape, of the way, at a point immediately in front of the vehicle, the instruction value being a value that allows the vehicle to travel along the latest course, and
an estimated instruction value calculator configured to calculate a future course and an estimated instruction value, on the basis of one or both of the outside surrounding condition information of the vehicle and the map information, the future course being a course in accordance with a shape, of the way, at a point at which the vehicle is to travel in future, the estimated instruction value being an estimated value that is to be output to the steering device on a condition that the vehicle is to be caused to travel along the future course,
the steering controller including
a storage configured to receive the estimated instruction value from the estimated instruction value calculator during a past predetermined period, the storage being configured to store estimated instruction values composed of the estimated instruction value received from the estimated instruction value calculator during the past predetermined period,
an instruction value checking unit configured to determine whether an abnormality is present or absent in the steering instruction unit by comparing the instruction value for a current point, on the way, at which the vehicle travels and a past estimated instruction value among the estimated instruction values stored in the storage, corresponding to the current point, on the way, at which the vehicle travels, and
a steering control unit configured to control the operation of the steering device on a basis of the instruction value.

2. The automatic steering control apparatus according to claim 1, wherein the instruction value checking unit determines that the abnormality is absent in the steering instruction unit and outputs the instruction value to the steering control unit, on a condition that the difference between the instruction value and the estimated instruction value is within a predetermined threshold range, and
wherein the instruction value checking unit determines that the abnormality is present in the steering instruction unit and stops the outputting of the instruction value, on a condition that the difference between the instruction value and the estimated instruction value is out of the predetermined threshold range.

3. An automatic steering control apparatus comprising:
a storage; and
circuitry configured to
  control operation of a steering device of a vehicle,
  output an instruction value,
  calculate a latest course and an instruction value, on a basis of latest information of one or both of outside surrounding condition information of the vehicle and map information regarding a way on which the vehicle travels, the latest course being a course in accordance with a shape, of the way, at a point immediately in front of the vehicle, the instruction value being a value that allows the vehicle to travel along the latest course, and
  calculate a future course and calculate an estimated instruction value, on the basis of one or both of the outside surrounding condition information of the vehicle and the map information, the future course being a course in accordance with a shape, of the way, at a point at which the vehicle is to travel in future, the estimated instruction value being an estimated value that is to be output to the steering device on a condition that the vehicle is to be caused to travel along the future course,
wherein the storage is configured to receive the estimated instruction value from the circuitry during a past predetermined period, the storage being configured to store estimated instruction values composed of the estimated instruction value received from the circuitry during the past predetermined period, and
wherein the circuitry further configured to
  determine whether an abnormality is present or absent by comparing the instruction value for a current point, on the way, at which the vehicle travels and an past estimated instruction value among the estimated instruction values stored in the storage, corresponding to the current point, on the way, at which the vehicle travels, and
  control the operation of the steering device on a basis of the instruction value.

4. The automatic steering control apparatus according to claim 1, wherein
  the estimated instruction value calculator is configured to calculate the estimated instruction value at a point in time when a predetermined time passes from the current point, and
  the past estimated instruction value is a value that was received from the circuitry the predetermined time ago by the storage and that was stored in the storage.

5. The automatic steering control apparatus according to claim 3,
  wherein the circuitry is configured to calculate the estimated instruction value at a point in time when a predetermined time passes from the current point, and
  wherein the past estimated instruction value is a value that was received from the circuitry the predetermined time ago by the storage and that was stored in the storage.

6. The automatic steering control apparatus according to claim 1, wherein, when the abnormality is determined present by the instruction value checking unit, the instruction value checking unit stops the instruction value calculator from outputting the instruction value to the steering control unit,
  further comprising an abnormality coping process unit configured to perform an abnormality coping process.

7. The automatic steering control apparatus according to claim 6, wherein, when the abnormality is determined present, further comprising stopping the output of the instruction value, and
  wherein the instruction value checking unit further notifies the abnormality coping process unit of the occurrence of the abnormality to cause the abnormality coping process unit to shift to the abnormality coping process.

8. The automatic steering control apparatus according to claim 7, wherein the abnormality coping process includes instructing the steering control unit to execute a fail-safe control until the driver starts steering manually.

9. The automatic steering control apparatus according to claim 7, wherein the abnormality coping process unit reads, from the storage, the estimated instruction value calculated an amount before the current instruction value is calculated, and instruct the steering control unit to perform a fail-safe control on a basis of the estimated instruction value calculated read.

* * * * *